C. B. CLARK.
FERTILIZER DISTRIBUTER.
APPLICATION FILED OCT. 23, 1908.
1,027,594.
Patented May 28, 1912.
2 SHEETS—SHEET 1.
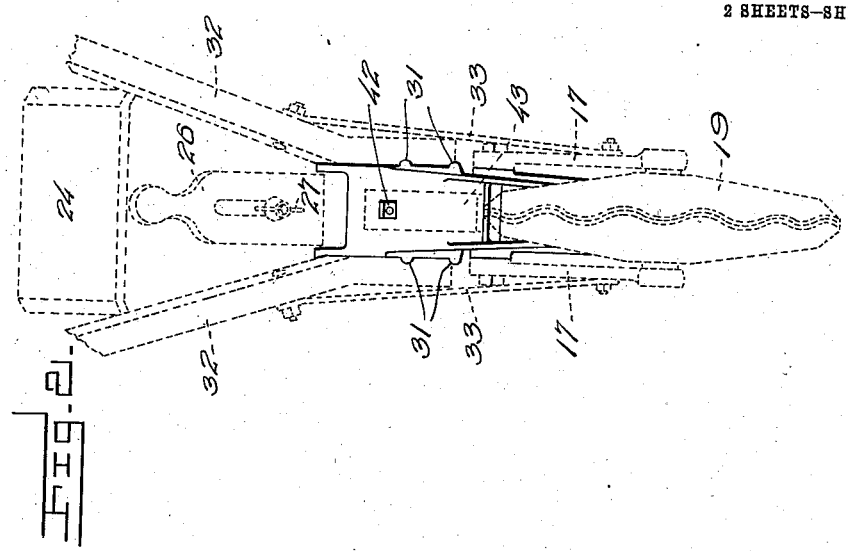
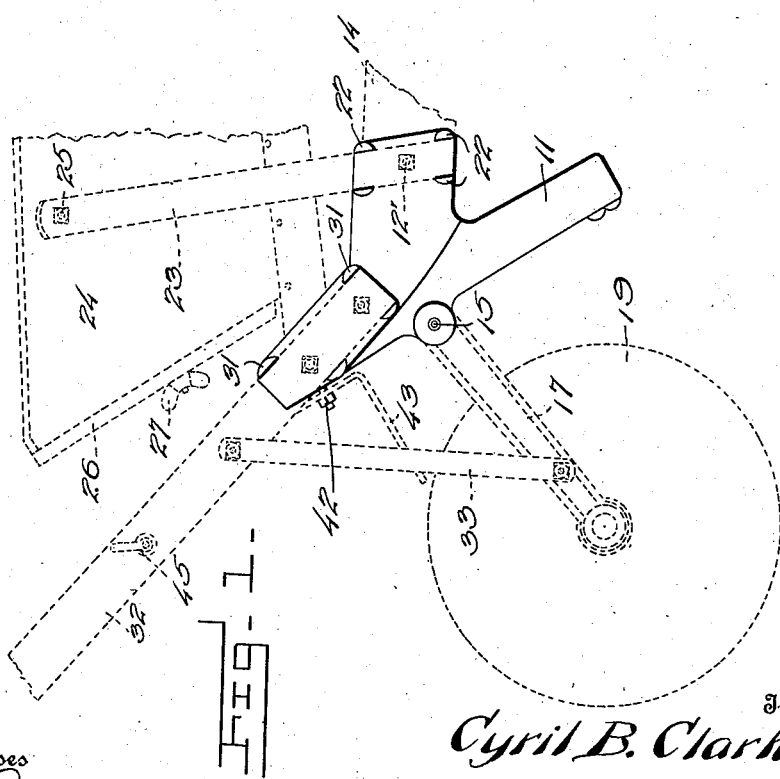
Inventor
Cyril B. Clark,
By C. J. Stockman
Attorney
Witnesses C. B. CLARK.
FERTILIZER DISTRIBUTER.
APPLICATION FILED OCT. 23, 1908.
1,027,594.
Patented May 28, 1912.
2 SHEETS—SHEET 2.
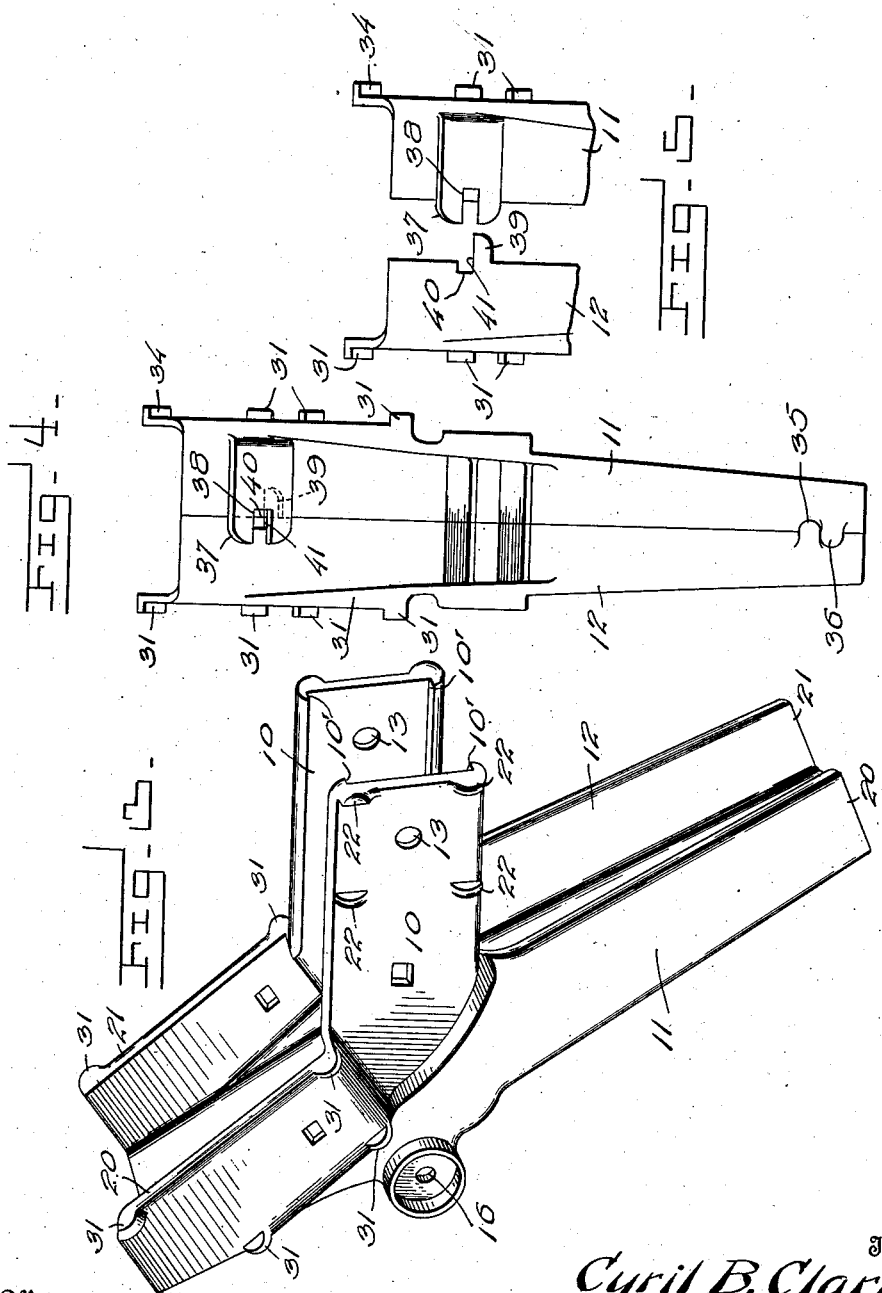
Witnesses
Inventor
Cyril B. Clark,
By C. J. Stockman
Attorney

UNITED STATES PATENT OFFICE.

CYRIL B. CLARK, OF NEW ALBANY, INDIANA, ASSIGNOR TO B. F. AVERY & SONS, OF LOUISVILLE, KENTUCKY, A CORPORATION OF KENTUCKY.

FERTILIZER-DISTRIBUTER.

1,027,594.   Specification of Letters Patent.   Patented May 28, 1912.

Application filed October 23, 1908. Serial No. 459,275.

*To all whom it may concern:*

Be it known that I, CYRIL B. CLARK, a citizen of the United States, residing at New Albany, in the county of Floyd and State of Indiana, have invented certain new and useful Improvements in Fertilizer-Distributers; and I do hereby declare the following to be a full, clear, and exact description of the invention, such as will enable others skilled in the art to which it appertains to make and use the same.

This invention relates to implements for distributing fertilizer or other material, and which comprises a beam, a handle, a supporting wheel or the like, a receptacle for the material to be distributed and a chute for conducting the material to the ground: and it has for its most important object the provision, in a machine of this kind, of a metallic member adapted to receive the beam, the handle and the wheel supports and to serve as a chute for conducting the material discharged from the receptacle.

With this and other objects in view, the invention comprises certain novel constructions, combinations and arrangements of parts, as will be hereinafter fully described and claimed.

The invention will be described with particular reference to the accompanying drawings, illustrating what is at present considered to be the best form of my invention, but it is to be understood that my invention is not restricted to the detailed embodiment herein shown.

In the drawings:—Figure 1 is a side elevation and Fig. 2 is a rear elevation of part of a fertilizer distributer embodying the present improvements, showing in full lines the metallic member of the present invention and in dotted outline the parts of the implement which are connected by said metallic member. Fig. 3 is a perspective view of the metallic member to be hereinafter more fully described. Fig. 4 is a rear elevation of said metallic member. And Fig. 5 is a detail view of the upper part of the metallic member, showing the sections thereof separated to disclose their tongues.

Like characters of reference designate corresponding parts throughout the several views.

In the drawings I have illustrated my present invention as embodied in a fertilizer distributer, this being a particularly useful embodiment thereof, but it will be understood that it may be embodied in other implements than those particularly intended for the distribution of fertilizer, without departing from the spirit of the invention or the scope of the subjoined claims.

The implement referred to comprises a beam, a part of which is shown at 14: a receptacle for the fertilizer or other material to be distributed, a portion of which is shown at 34: a supporting wheel 19 at the rear of the implement: arms 17, 17 between which the supporting wheel is journaled: standards 23, 23 by which the receptacle is carried from the beam: handles 32, 32: braces 33, 33 extending from the handles to the arms 17: a scraper 43 which bears upon the periphery of the wheel 19: and a metallic member 10 which connects the parts together. In practice the receptacle of the illustrated embodiment of the invention is jogged or vibrated to faciliate the discharge of the material therefrom, being mounted by pivots 25 upon the upper ends of the uprights 24 and having its discharge opening at the bottom of its rear end, the pivots 25 being arranged eccentrically of the receptacle. The area of the discharge opening is regulated by a slide 26 held in adjusted position by a thumb screw 27 and its bolt. The particular means for jogging the receptacle forms no part of the present invention and for this reason is not herein illustrated.

The metallic member 10 hereinbefore referred to, which preferably is a casting is composed of left and right hand sections 11 and 12, substantially similar to each other, and suitably connected together by means of a bolt 12' extending through the openings 13 and the beam 14, and a bolt 15 extending through the openings 16. Additional means may also be provided to prevent the accidental dislocation of the two sections, as, for example, by laterally projecting lugs 36 and 35 integrally formed with the sections 11 and 12 respectively, and adapted to overlap the opposing edges of the sections and contact with each other so as to prevent an up and down movement of the sections relatively to each other. Other means may be employed for this purpose, either independently or in conjunction with the means above referred to, the illustrated embodiment showing the lugs 35 and 36 near the lower end of the metallic member while positioned near the upper end of the metallic member additional holding means are provided, consisting of an overlapping tongue portion 37 extending from the section 11 and provided with a slot 38 which in conjunction with a similar tongue portion 39 extending from the section 12 and a slot 40, an opening 41 when the parts are in the position shown in Fig. 4. A bolt 42 is inserted through said opening and serves to secure the sections together and to position a scraper 43.

The beam 14 is positioned between forwardly extending portions of the metallic member 10 and is held in place by upper and lower lugs 10' and the bolt extending through the beam and the openings 13 in the casting. The wheel supporting arms 17 extend from the metallic member 10 to which they are secured, as by means of the bolt 15. At the rear upper ends the sections 11 and 12 are provided with lugs 31 between which are secured the handles 32 of the machine.

Adjacent the forward end of each of the sections 11 and 12 spaced lugs 22 are provided in proper position to reinforce the lower extremity of the receptacle-supporting upright 23 arranged between them, and said lugs prevent the accidental movement of the upright. The uprights 23 are suitably secured to the metallic member as by the bolt 12' extending through openings in the metallic member and uprights.

Each section 11 and 12 is provided with an upturned flange or side portion, 20 and 21 respectively, and these flanges or side portions in conjunction with the back of the sections form a chute adapted to conduct the material discharged from the receptacle to the desired point in the furrow.

While the foregoing mechanism is well adapted to accomplish the several purposes of this invention, it will be understood that my invention is not restricted thereto, but is capable of many changes, variations, and modifications within the spirit of the invention and the scope of the subjoined claims.

What I claim is:—

1. In a machine of the character described, a metallic member composed of substantially similar interengaging sections adapted to receive the beam, the handles and the wheel supports, and to be held together by means serving at the same time to secure the beam, handles and wheel supports in position.

2. In a machine of the character described, a metallic member composed of substantially similar interengaging sections adapted to receive the beam, the handles and the wheel supports, and to serve as a discharge chute, said sections being held together by means serving at the same time to secure the beam, handles and wheel supports in position.

3. In a machine of the character described, a metallic member, composed of substantially similar interlocking sections provided with lugs adapted to receive the beam, handles and the wheel supports, and to be held together by bolts serving at the same time to secure the beam, handles and wheel supports in position.

4. In a machine of the character described, a metallic member composed of substantially similar interlocking sections provided with lugs adapted to receive the beam, handles and wheel supports, and to serve as a discharge chute, said sections being held together by means serving at the same time to secure the beam, handles and wheel supports in position.

5. In a machine of the class described, a metallic member comprising interlocking complementary parts, a pair of handles, one secured to each of the interlocking parts, a pair of wheel supports one secured to each of the interlocking parts, a pair of upright receptacle supports, one secured to each of the interlocking parts, a beam disposed between said parts, means inserted through said parts and the beam whereby the parts are held rigidly in engagement, and means adapted to discharge material into the metallic member.

6. In a machine of the class described, a metallic member comprising overlapping slotted engaging parts, wheel supports, one secured to each of said parts, a bolt extending through the overlapping slotted engaging parts, and a wheel scraper carried by the bolt.

In testimony whereof I affix my signature in presence of two witnesses.

CYRIL B. CLARK.

Witnesses:
W. P. VENHOFF,
F. W. REDDING.

---

Copies of this patent may be obtained for five cents each, by addressing the "Commissioner of Patents, Washington, D. C."